United States Patent [19]
Asano et al.

[11] Patent Number: 5,880,852
[45] Date of Patent: Mar. 9, 1999

[54] READING UNIT AND RECORDING APPARATUS ON WHICH THE READING UNIT IS MOUNTABLE

[75] Inventors: Shinya Asano, Tokyo; Tsutomu Kawai; Kazuya Iwata, both of Yokohama; Hiroyuki Tanaka, Kawasaki, all of Japan

[73] Assignee: Canon Kabushiki Kaisha, Tokyo, Japan

[21] Appl. No.: 938,847

[22] Filed: Sep. 26, 1997

Related U.S. Application Data

[63] Continuation of Ser. No. 651,742, May 22, 1996, abandoned.

[30] Foreign Application Priority Data

| May 23, 1995 | [JP] | Japan | 7-123318 |
| May 29, 1995 | [JP] | Japan | 7-130508 |
| Oct. 18, 1995 | [JP] | Japan | 7-269812 |

[51] Int. Cl.$^6$ .......................... H04N 1/00; H04N 1/024; H04N 1/034; H04N 1/04
[52] U.S. Cl. .......................... 358/296; 358/406; 358/472; 358/474; 358/487; 347/3
[58] Field of Search .................................. 358/296, 401, 358/406, 471, 472, 474–483, 487, 494, 501, 502, 504–506; 399/45, 74; 347/2, 3, 105, 106; 348/272, 294; 250/208.1, 208.2

[56] References Cited

U.S. PATENT DOCUMENTS

| 4,680,644 | 7/1987 | Shirato et al. | 358/294 |
| 4,791,493 | 12/1988 | Ogura et al. | 358/294 |
| 4,920,431 | 4/1990 | Ogura et al. | 358/293 |
| 4,926,058 | 5/1990 | Iwamoto et al. | 250/578 |
| 4,996,606 | 2/1991 | Kawai et al. | 358/475 |
| 5,101,285 | 3/1992 | Kawai et al. | 358/471 |
| 5,187,595 | 2/1993 | Kitani et al. | 358/482 |
| 5,189,251 | 2/1993 | Ohtsubo et al. | 358/296 |
| 5,233,442 | 8/1993 | Kawai et al. | 358/482 |
| 5,272,548 | 12/1993 | Kawai et al. | 358/482 |
| 5,572,329 | 11/1996 | Otsubo et al. | 358/296 |

*Primary Examiner*—Robert E. Nappi
*Assistant Examiner*—Gregory J. Toatley, Jr.
*Attorney, Agent, or Firm*—Fitzpatrick, Cella, Harper & Scinto

[57] ABSTRACT

A recording apparatus in which a recording head for effecting recording on a recording medium can be carried on a carriage movable with a reading unit for performing an original reading operation carried thereon, including a white flat plate member removable provided at a location opposed to the reading unit and along an area in which the carriage is moved. A reading unit for use in a recording apparatus in which a recording head unit for effecting recording on a recording medium and the reading unit for reading the image of an original are selectively interchangeable relative to a reciprocally movable carrier, including original image reading means constituting a predetermined reading optical path entering and reflected by the surface of the original to read the image of the original, and a movable member having reference correction means for reading moved to a position on the reading optical path corresponding to the surface of the original when the carrier is in a predetermined position.

23 Claims, 13 Drawing Sheets

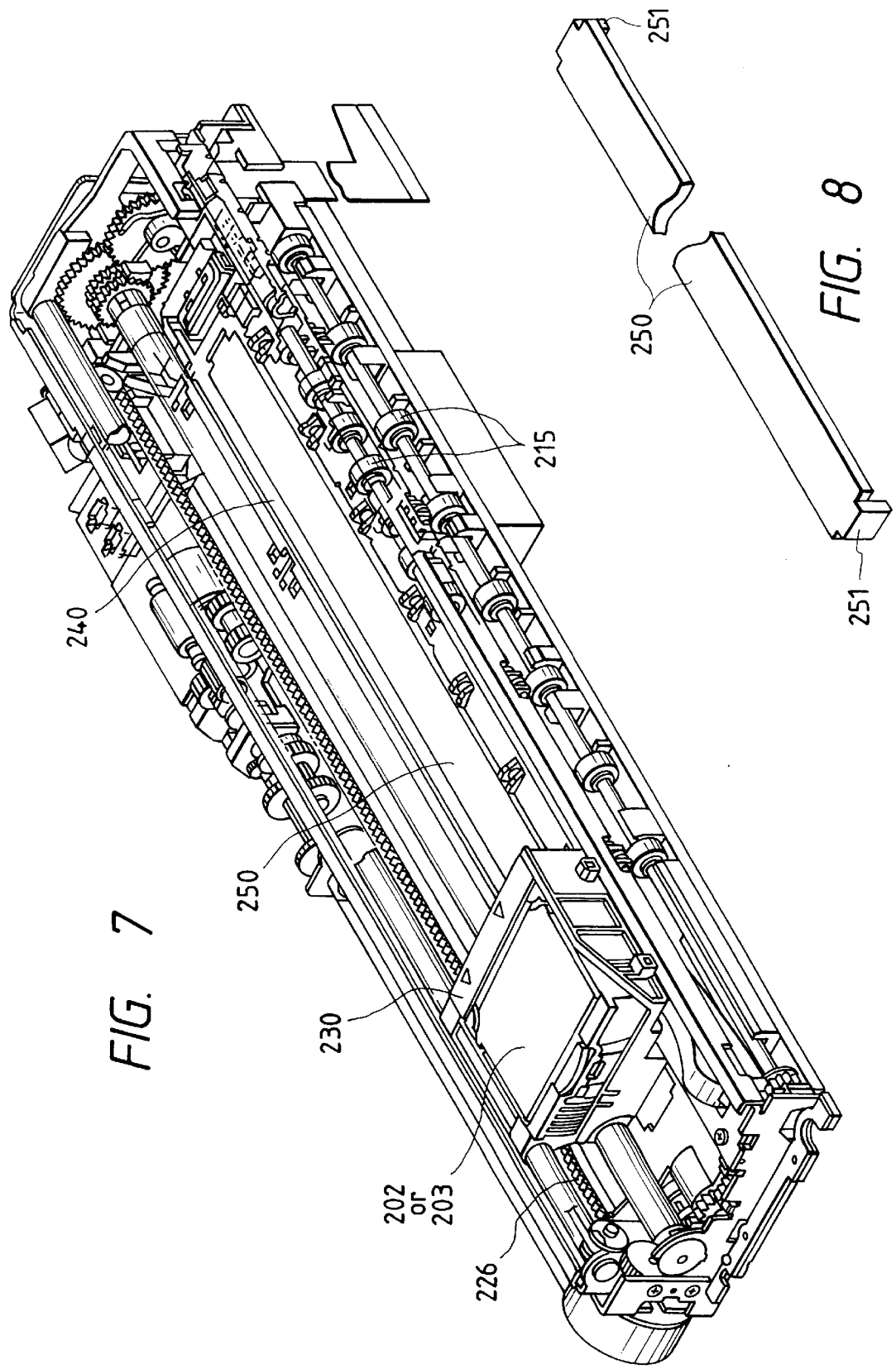

FIG. 11B
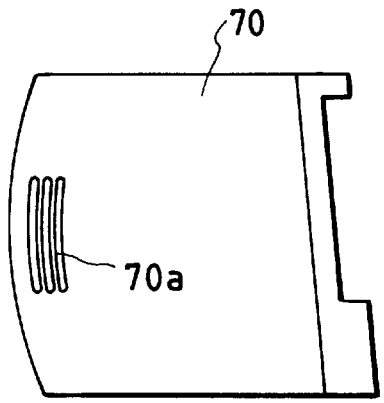
FIG. 11C
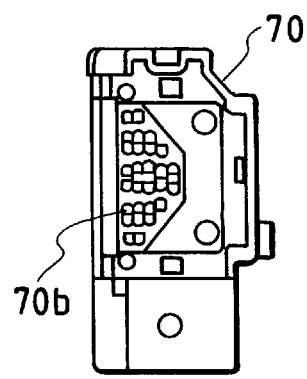
FIG. 11D
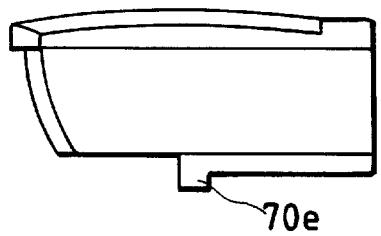
FIG. 11A
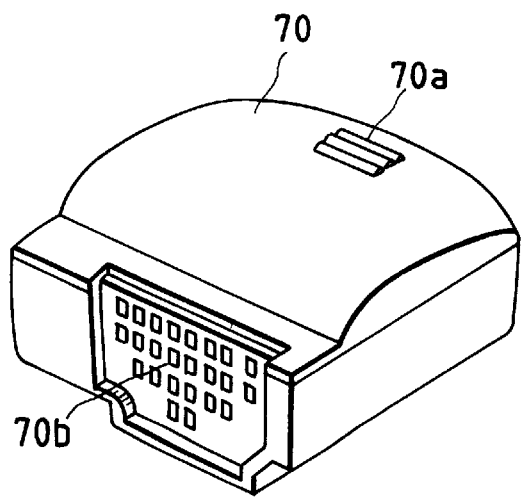
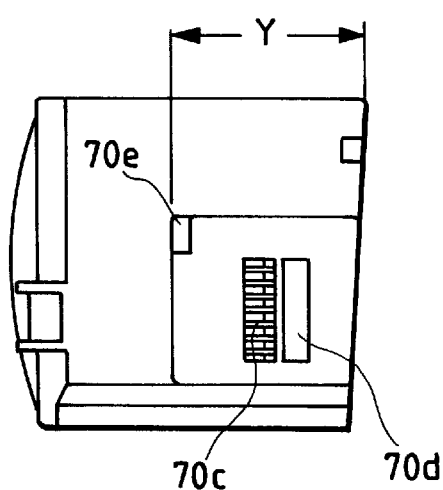
FIG. 11E

WHITE REFERENCE SURFACE SIDE

READING UNIT AND RECORDING APPARATUS ON WHICH THE READING UNIT IS MOUNTABLE

This application is a continuation of application Ser. No. 08/651,742 filed May 22, 1996, now abandoned.

BACKGROUND OF THE INVENTION

1. Field of the Invention

This invention relates to a removably mountable reading unit and a recording apparatus on which the reading unit is mountable.

2. Related Background Art

In a conventional serial printer, recording is effected with an ink ribbon cassette of the heat transfer type, the wire dot type or the daisy wheel type or a head cartridge of the ink jet type placed on a carriage reciprocally movable in a direction along a recording medium and differing from the conveyance direction of the recording medium.

There is also a reading printer which functions as a reading apparatus by a reading unit having the reading function, instead of an ink ribbon cassette, being carried on a carriage.

Generally a reading printer is designed such that light is applied from a light source mounted on a reading unit to the surface of an original and a reflected image from the surface of the original is read by a reading sensor by way of a lens or the like, and is so contrived that a carriage is serially reciprocated and each time one line is read, the original is conveyed, whereby the content of one page is read.

In the conventional reading printer described above, during the reading operation from OHP paper, when a light transmitting plastic sheet or thin paper is used, it has sometimes been the case that the unevenness, aperture, color or the like of a printer body such as a platen which is a recording base for paper during recording is read through such original.

Also, it has sometimes been the case that when the platen is stained by the adherence of ink or the like during recording, paper is stained during reading, or when as in the above-described case, the reading operation from OHP paper or thin paper is performed, the stains on the platen are read through such original.

SUMMARY OF THE INVENTION

The present invention has been made in view of the above-noted problems peculiar to the prior art and an object thereof is to provide a recording apparatus having the reading function which does not read unnecessary information in the lower portion of an original through the original even when it performs the reading operation from OHP paper (light transmitting plastic sheet) or thin paper.

Another object of the present invention is to provide a recording apparatus in which a recording head for effecting recording on a recording medium can be carried on a carriage movable with a reading unit for performing an original reading operation carried thereon, including a white flat plate member removably provided at a location opposed to the reading unit and along an area in which the carriage is moved.

Still another object of the present invention is to provide a reading unit for use in a recording apparatus in which a recording head unit for effecting recording on a recording medium and the reading unit for reading the image of an original are selectively interchangeable relative to a reciprocally movable carrier, including:

original image reading means constituting a predetermined reading optical path entering and reflected by the surface of the original to read the image of the original; and a movable member having reference correction means for reading moved to a position on the reading optical path corresponding to the surface of the original when the carrier is in a predetermined position.

Yet still another object of the present invention is to provide a recording apparatus having carrying means capable of carrying thereon a recording head for discharging ink to thereby record an image and an image scanner unit for reading an image described on a recording medium, and a white reference provided with a reference surface for calibrating the image scanner unit provided opposably to the carrying means, the recording apparatus including:

isolating means for isolating the reference surface of the white reference from a space in the apparatus in which recording is effected by the recording head when the calibration of the image scanner unit is not carried out.

BRIEF DESCRIPTION OF THE DRAWINGS

FIG. 7 is a pictorial view of the construction around the carriage of an ink jet recording apparatus showing a first embodiment of the present invention.

FIG. 8 is a pictorial view showing an example of the construction of a flat plate member applied to the ink jet recording apparatus shown in FIG. 1.

FIGS. 11A to 11E show the constructions of an image scanner unit carried on an ink jet recording apparatus as an embodiment of the present invention, FIG. 11A being a perspective view thereof, FIG. 11B being a top plan view thereof, FIG. 11C being a side view in which a scanner terminal portion can be seen, FIG. 11D being a side view in which a scanner projected portion can be seen, and FIG. 11E being a bottom plan view thereof.

DESCRIPTION OF THE PREFERRED EMBODIMENTS

Some embodiments of the present invention will hereinafter be described with reference to the drawings.

Figure 1:
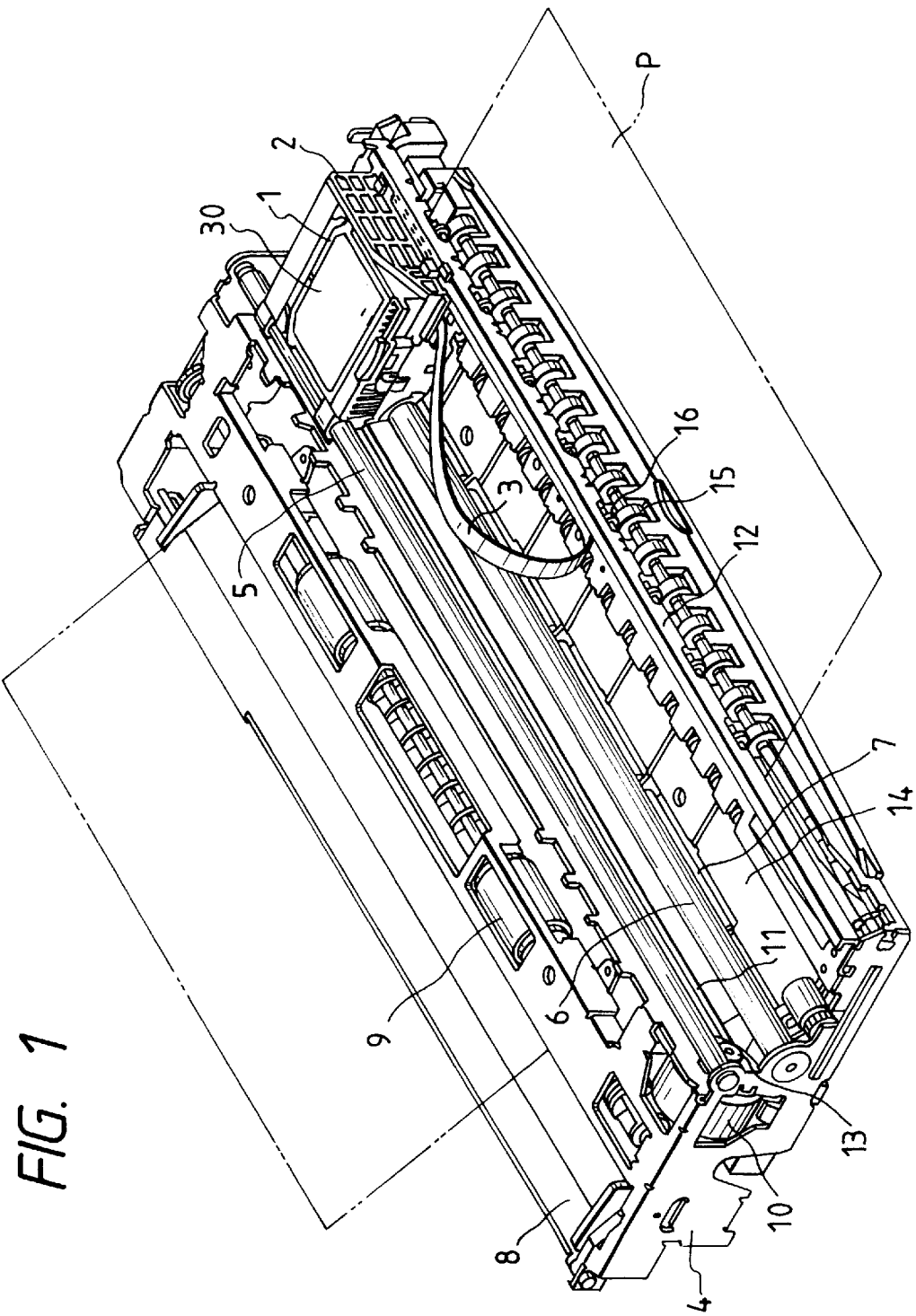
FIG. 1 is a perspective view showing the construction around the carriage of an ink jet recording apparatus capable of carrying thereon an image scanner as an embodiment of the present invention.

Referring to FIG. 1, a carriage 2 on which a recording head cartridge 1 for discharging ink to thereby effect recording is removable carried is supported on a guide shaft 5 and a guide rail 12 having their opposite end portions fixed to a frame 4 and disposed parallel to each other for sliding movement in a direction orthogonal to the conveyance direction of a recording medium P and parallel to the plane of the recording medium P. Also, the carriage 2 is coupled to a region of a carriage driving belt 11 passed over and between a drive pulley 13 secured to the output shaft of a carriage driving motor 10 and a rotatably journalled follower pulley (not shown), and by the carriage driving motor 10 being driven, the carriage driving belt 11 is rotated, whereby the carriage 2 is reciprocally movable.

The recording head cartridge 1 has a nozzle portion (not shown) for discharging the ink on the basis of a recording signal which is an electrical signal for ink discharge, and a monochrome holder (not shown), and an ink tank 30 containing the ink therein is removable held on the monochrome holder. The nozzle portion is provided on the bottom (the lower end portion as viewed in FIG. 1) of the recording head cartridge 1, and the ink is discharged downwardly as viewed in FIG. 1. The recording signal to the recording head cartridge 1 is transmitted from a control base plate (not shown) for controlling the operation of the ink jet recording apparatus, through a flexible cable 3 provided on the carriage 2. The flexible cable 3 is disposed along the direction of movement of the carriage 2 and forms a loop with the movement of the carriage 2. The recording head cartridge 1 and the carriage 2 will be described later is detail.

The recording mediums P are piled on a pressure plate 8 having its opposite end portions rotatably supported by the frame 4. The pressure plate 8 is biased toward a pickup roller 9 by biasing means (not shown), and the recording mediums P piled on the pressure plate 8 are urged against the pickup roller 9. When the pickup roller 9 is rotated by a paper supply command from the control base plate, a recording medium P is fed out by the frictional force between the pickup roller 9 and the recording medium P. The pressure plate 8 is provided with separating means (not shown) such as a separating pawl as used in a conventional automatic paper feeding device, and only the uppermost recording medium P can be fed out by the action of this separating means.

The recording medium P fed out by the pickup roller 9 is conveyed to below the carriage 2 while being held by and between a conveying roller 6 having its opposite end portions supported by the frame 4 and a pinch roller 7 provided on a base 14, and at this position, recording is effected on the recording medium P. A paper discharge roller 15 and a spur 16 are disposed in opposed relationship with each other downstream of the carriage 2 with respect to the conveyance direction of the recording medium P, and the recording medium P having passed below the carriage 2 is discharged while being held by and between the paper discharge roller 15 and the spur 16. The driving of the pickup roller 9, the conveying roller 6 and the paper discharge roller 15 is effected with a conveying drive motor (not shown) as a drive source.

Figure 2:
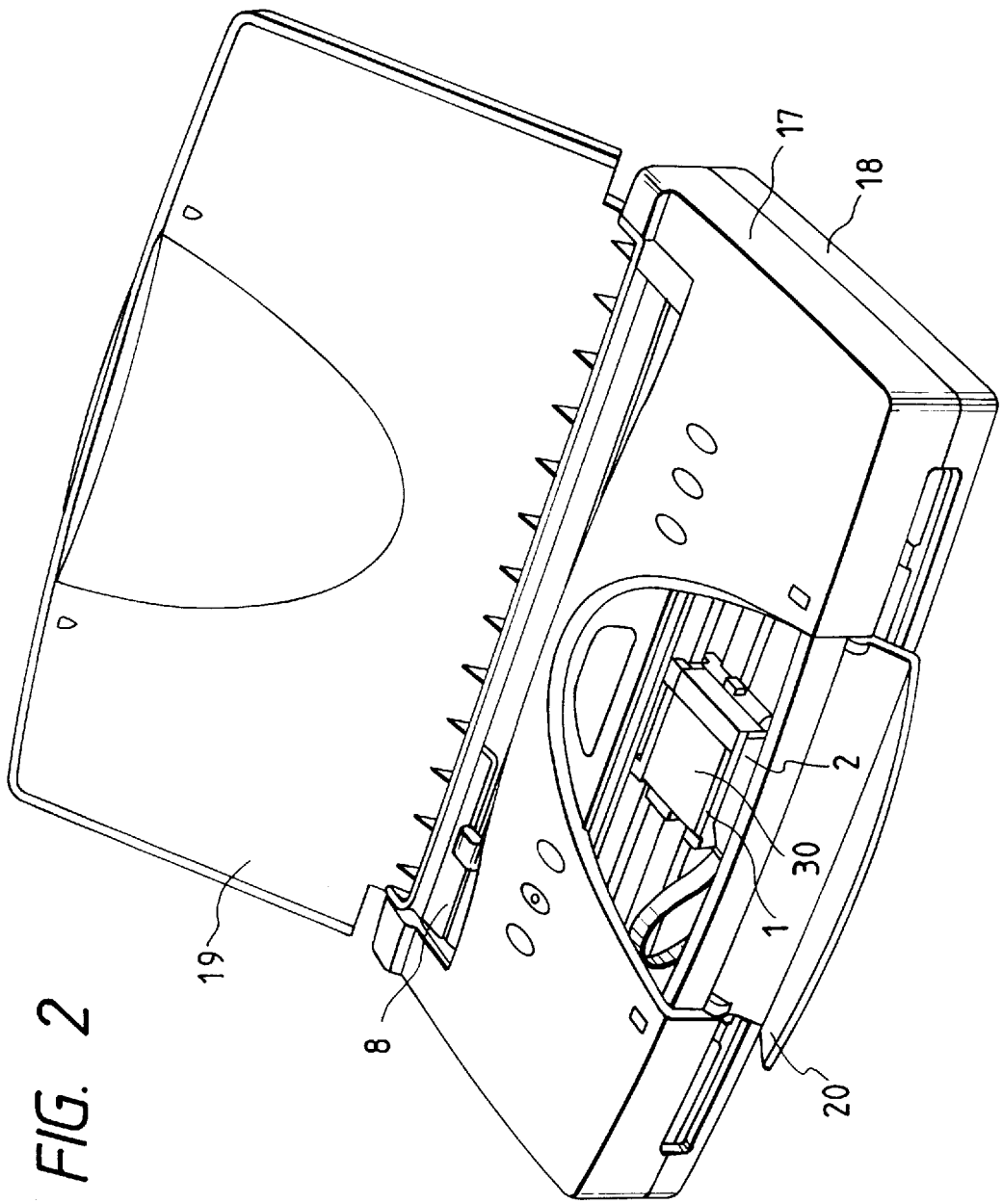
FIG. 2 is a perspective view showing a state in which the construction around the carriage of the ink jet recording apparatus shown in FIG. 1 is contained in a housing.

FIG. 2 is a perspective view showing a state in which the ink jet recording apparatus shown in FIG. 1 is contained in a housing. In the ensuing description, the upstream side with respect to the conveyance direction of the recording medium P is referred to as the inner side and the surface thereof is referred to as the back, and the downstream side is referred to as this side and the surface thereof is referred to as the front.

As shown in FIG. 2, the ink jet recording apparatus shown in FIG. 1 is contained in a housing having its exterior constructed of a lower case 18 and an upper case 17. On the inner side of the upper case 17, a first opening portion is provided at a region corresponding to the pressure plate 8, and a top cover 19 covering the upper case 17 is openably provided. The top cover 19 may be opened to thereby provide a tray for setting the recording medium P on the pressure plate, and the recording medium P is fed in through the first opening portion.

Also, a second opening portion is provided in the upper case 17 from the central portion to the front thereof, and the recording head cartridge 1, the image scanner unit or the ink tank 30 can be mounted and dismounted through this second opening portion. For this purpose, during the interchange of the recording head cartridge 1, the image scanner unit and the ink tank 30, the carriage 2 is moved to the center by a predetermined operation. On this side of the second opening portion for interchange, there is openably provided a head cover 20 covering a portion of the upper surface and the front of the second opening portion, and except during the interchange of these, the head cover 20 is closed to thereby protect the recording head cartridge 1 and the image scanner unit.

The recording head cartridge 1 will now be described with reference to FIGS. 3 to 6.

Figure 3:
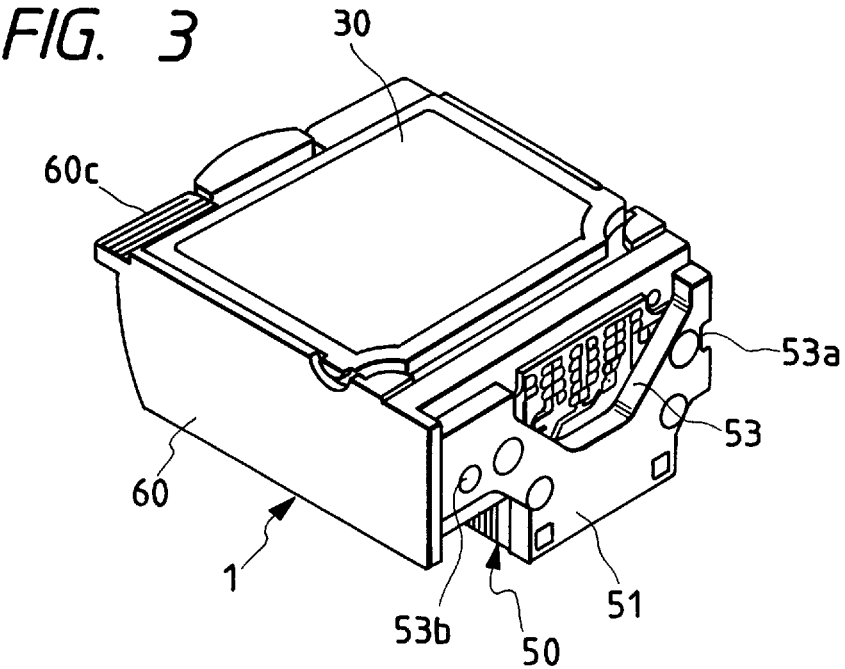
FIG. 3 is a perspective view of a recording head cartridge shown in FIG. 1 as it is seen from a direction in which a head terminal portion can be seen.
Figure 4:
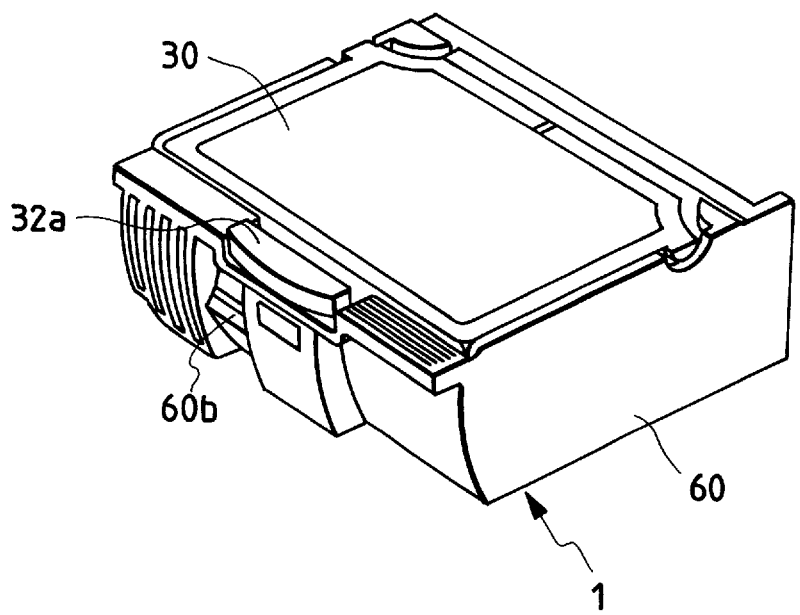
FIG. 4 is a perspective view of the recording head cartridge shown in FIG. 3 as it is seen from a direction in which a surface opposite to the surface of the head terminal portion can be seen.
Figure 5:
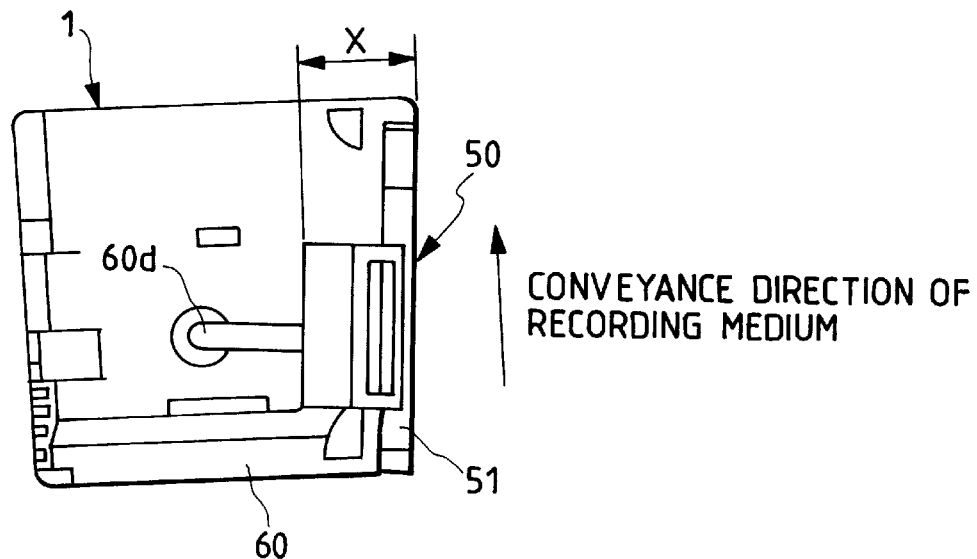
FIG. 5 is a bottom plan view of the recording head cartridge shown in FIG. 3.

FIG. 3 is a perspective view of the recording head cartridge shown in FIG. 1 as it is seen from a direction in which a head terminal portion can be seen, and FIG. 4 is a perspective view of the recording head cartridge shown in FIG. 3 as it is seen from a direction in which a surface opposite to the surface of the head terminal portion can be seen. FIG. 5 is a bottom plan view of the recording head cartridge shown in FIG. 3, and FIG. 6 is an enlarged perspective view of the essential portions of the nozzle portion of the recording head cartridge shown in FIG. 5.

The recording head cartridge described in the present embodiment is a cartridge for monochrome, and as shown in FIGS. 3 and 5, it is of a construction in which a nozzle portion 50 for discharging the ink and a box-shaped monochrome holder 60 having an opening portion in the upper surface thereof are made integral with each other, and the ink tank 30 containing the ink therein is removably mounted in the monochrome holder 60.

Figure 6:
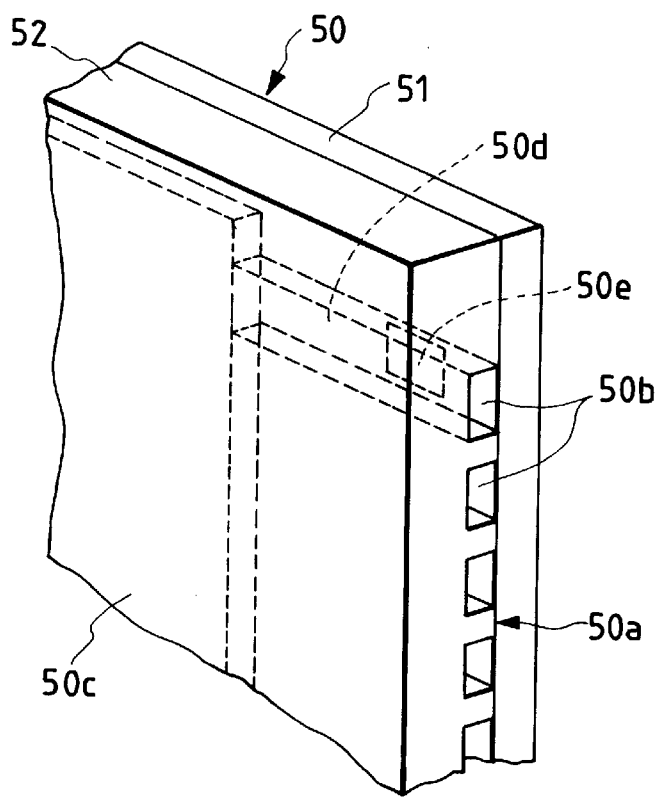
FIG. 6 is an enlarged perspective view of the essential portions of the nozzle portion of the recording head cartridge shown in FIG. 5.

The nozzle portion 50, as shown in FIG. 6, comprises a base plate 51 comprising a metallic plate of aluminum or the like and a grooved member 52 formed with a groove constituting a plurality of liquid path 50d and a common liquid chamber 50c and secured to the base plate 51, and a plurality of discharge ports 50b which are the opening ends of the liquid paths 50d are formed in a discharge port surface 50a facing the recording medium P (see FIG. 1). The liquid paths 50d are formed at a predetermined pitch, and electro-thermal conversion members (heat generating resistance members) 50e generating energy for ink discharge are disposed on the base plate 51 correspondingly to the respective liquid paths 50d. The ink is supplied from the ink tank 30 (see FIG. 3) to the common liquid chamber 50c. Each of the electro-thermal conversion members 50e is electrically connected to the head terminal portion 53 shown in FIG. 3 through wiring.

In the recording head cartridge 1 constructed as described above, the ink supplied from the ink tank 30 to the common liquid chamber 50c is directed to the respective liquid paths 50d and is maintained forming meniscus in the discharge ports 50b. At this time, the electro-thermal conversion members 50e are selectively driven, whereby film boiling is created and air bubbles are created in the liquid paths 50d, and by growth of the air bubbles, the ink is discharged from the discharge ports 50b. Herein, the electro-thermal conversion members 50e are shown as elements generating the energy for discharging the ink, whereas this is not restrictive, but use may be made of piezoelectric elements or the like generating mechanical energy momentarily applying discharge pressure.

Also, as shown in FIG. 3, the base plate 51 secured to one end wall of the monochrome holder 60 is formed with a head positioning cut-away 53a and a head positioning aperture 53b. These are engaged by the head positioning projections 2d and 2e (see FIG. 10) of the aforedescribed carriage 2. Also, the head terminal portion 53 connected to the electro-thermal conversion members 50e contacts with the cable terminal portion 3a (see FIG. 10) of the aforedescribed carriage 2. Also, a head mounting-dismounting operation portion 60c is provided so that a user can put his fingers on it and pull it up so as to easily remove the recording head cartridge 1 when the cartridge is to be removed from the carriage 2.

As shown in FIG. 4, the ink tank 30 is incorporated in the monochrome holder 60 and can be simply interchanged by pushing a latch lever 32a. Also, a head pressing portion 60b is engaged with the head guide 22 of the carriage 2 shown in FIG. 10. As shown in FIG. 5, the nozzle portion 50 is mounted on the base plate 51 and is connected to the monochrome holder 60 by an ink flow path 60d, and the ink is supplied from the ink tank 30 to the aforementioned common liquid chamber 50c (see FIG. 6).

[First Embodiment]

FIG. 7 is a pictorial view around the carriage of the ink jet recording apparatus showing a first embodiment of the present invention.

The present embodiment, as shown in FIG. 7, is comprised chiefly of a carriage 230 carrying a recording head 202 or a reading unit 203 thereon, paper conveying rollers 215 for conveying recording paper (not shown), a carriage belt 226 for reciprocally moving the carriage 230 in the sub-scanning direction of the recording paper, and a white flat plate member 250 provided on a platen 240.

As described above, the flat plate member is fitted into the recording apparatus body and the whole of the upper surface of the platen is covered with the flat plate member 250, whereby unevenness, apertures, colors and ink stains on the platen are hidden, and even when an original to be read (not shown) is OHP paper such as a light transmitting plastic sheet or thin paper, such unevenness, apertures, colors and ink stains can be prevented from being read through the original to be read.

FIG. 8 is a pictorial view showing an example of the construction of the flat plate member applied to the ink jet recording apparatus shown in FIG. 7.

The flat plate member 250 shown in FIG. 8 is made of a blank which is white and has such a thickness as not to transmit light therethrough and which reflects light, and is of such a shape that restraining projections 251 at the opposite ends thereof are inserted into the apparatus body and it is contained in the apparatus body as shown in FIG. 7. Also, the flat plate member 250 is designed to fit into a slight recess provided in the ink jet recording apparatus so as not to hinder the reciprocal movement of the carriage 230 carrying the reading unit 203 thereon and the conveyance of the original to be read when the ink jet recording apparatus operates as an image reading apparatus.

Description has been made above of a case where the flat plate member is applied to an ink jet recording apparatus which permits the interchange of the reading unit and the recording head, and even during recording and even in the application of the flat plate member to an ink jet recording apparatus in which the recording unit is normally carried on the carriage, the flat plate member 250 is fitted in the apparatus during reading as described above, whereby a similar effect is obtained.

Description will further be made of an example in which the flat plate member 250 is used for white correction.

When the ink jet recording apparatus operates as an image reading apparatus, white reference setting is effected for a certain color in an image processing IC, whereafter the set color is recognized as white. Therefore, a member for white reference setting becomes necessary.

So, this white reference setting is effected by the use of the white flat plate member 250, whereby it becomes unnecessary to newly provide a member for white reference setting.

The first embodiment, which is constructed as described above, achieves effects which will be described below.

Because of the construction in which along the movement area of the carriage, the removably mountable white flat plate member is provided on the surface opposed to the reading unit, even when during the reading operation, the original is transparent paper such as OHP paper or thin paper, the unevenness, apertures and colors of the apparatus body which are unnecessary information in reading and stains such as ink scattered onto the platen, etc. of the ink jet recording apparatus during recording can be prevented from being read. Also, the flat plate member is removably mountable and therefore, during the reading operation, it is possible to remove it from the apparatus body so as not to affect the recording state.

Further, because of the construction in which the flat plate member serves also as a white reference setting member, it is unnecessary to newly add a part for white reference setting and thus, an increase in cost can be prevented.

[Second Embodiment]

In the ink jet recording apparatus of the first embodiment as described above, the white reference may be stained with the ink to thereby cause an inconvenience to calibration.

Also, when the white reference is not contained, there will be required the trouble of passing the white sheet which is the white reference to the conveyance path.

So, a second embodiment which will hereinafter be described is an ink jet recording apparatus capable of carrying an image scanner (reading unit) thereon in which the stains of the white reference are reliably prevented to thereby eliminate the inconvenience to calibration and the trouble such as cleaning is not required.

Figure 9:
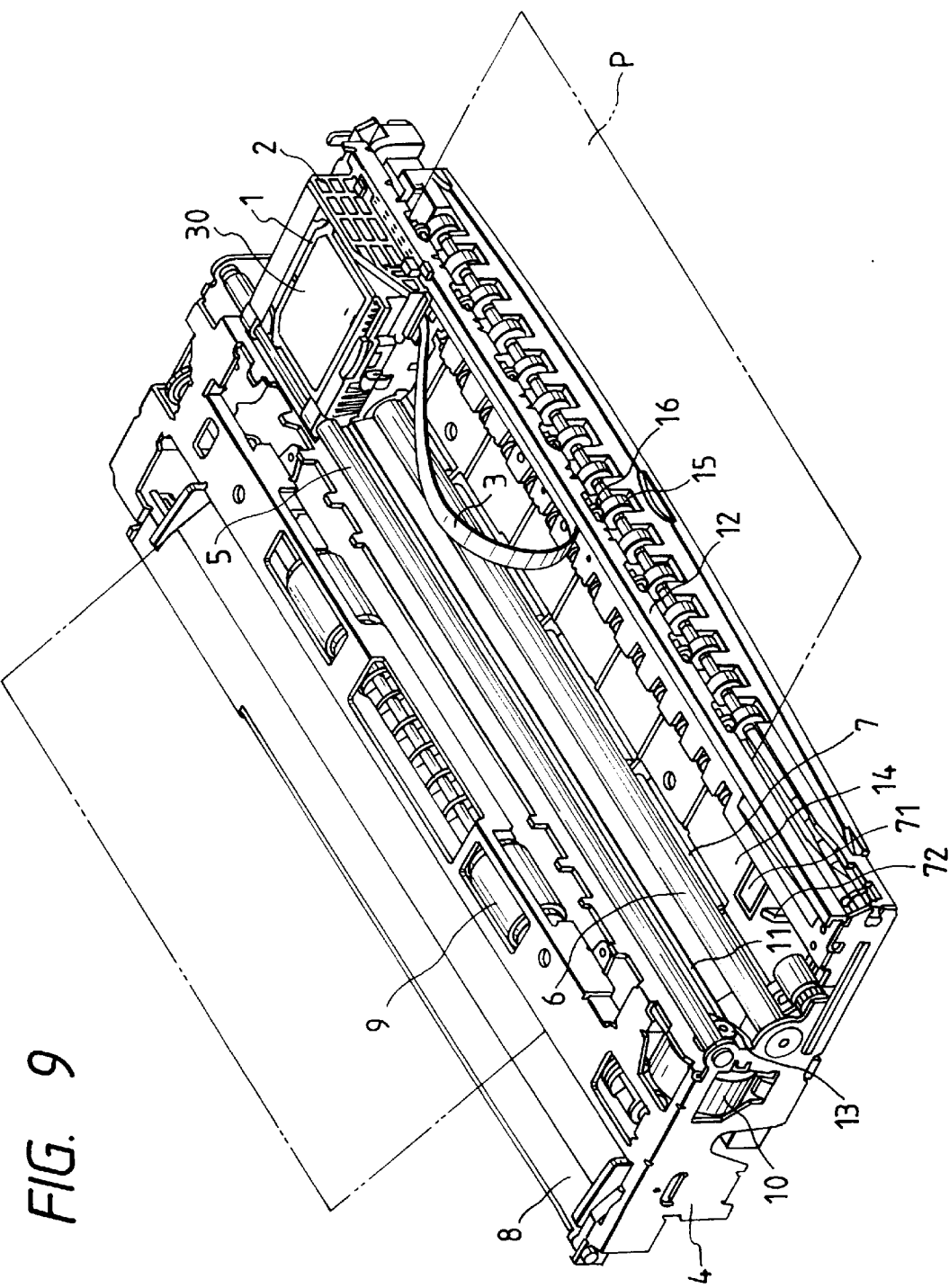
FIG. 9 is a pictorial view of the construction around the carriage of an ink jet recording apparatus showing a second embodiment of the present invention.

FIG. 9 is a perspective view showing the construction around the carriage of an ink jet recording apparatus carrying an image scanner thereon according to the present embodiment. In this embodiment, design is made such that the white reference is contained in the ink jet recording apparatus and when the image scanner unit is not calibrated, the reference surface of the white reference is hidden so that ink mist or the like may not adhere thereto. Also, design is made such that during calibration, the reference surface of the white reference is automatically disposed in opposed relationship with the image scanner unit.

An image scanner unit (image reading unit) mountable on an ink jet recording apparatus will be described. The ink jet recording apparatus according to the embodiment usually operates as an ink jet recording apparatus and as an apparatus for mounting the image scanner unit on demand. The image scanner unit will be described in detail hereinafter. However, the shape of the image scanner unit is substantially the same as the recording head cartridge 1 and can be replaced with the recording head cartridge 1 to perform as the image scanner.

The white reference 71 used for calibrating an output level of a reading sensor of the image scanner unit is assembled at a left end of the base 14 (platen) as shown in FIG. 9. Except while the apparatus operates the ink jet recording apparatus and the image scanner unit performs the calibration, a calibration reference surface of the white reference 71 is oriented to the inside of the base 14 (downward in FIG. 9) so that contamination caused by ink mist is prevented from being deposited. Furthermore, the white reference 71 operates in association with a white reference shutter lever 72 and is opposed to the image scanner unit with the reference surface laid upward by laying the white reference shutter lever 72 down so that the output level can be calibrated. The white reference shutter lever 72 is laid down by a projection provided on the image scanner unit only when the image scanner unit is mounted on the carriage 2 and scanned to the left side as shown in FIG. 9 and is not laid down due to the shape when the recording head cartridge 1.

The carriage 2 will now be described with reference to FIG. 10.

Figure 10:
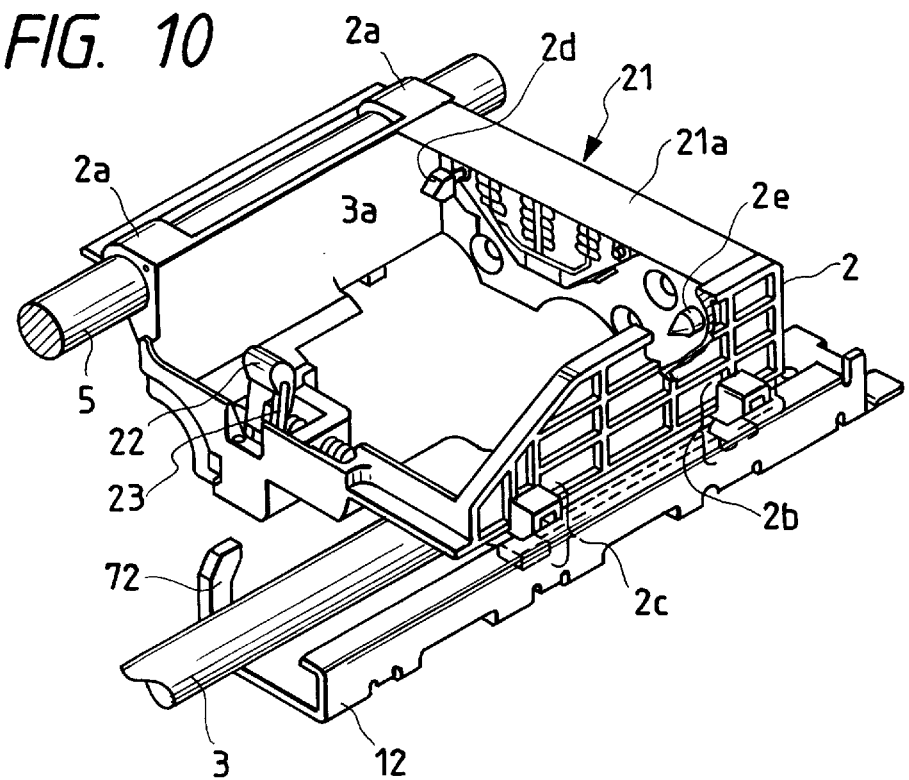
FIG. 10 is a perspective view showing the construction of the carriage of the ink jet recording apparatus shown in FIG. 9.

FIG. 10 is a perspective view showing the construction of the carriage of the ink jet recording apparatus shown in FIG. 9. As shown in FIG. 10, the carriage 2 is generally of a frame-like shape, and the recording head cartridge 1 is mounted in the hollow portion thereof. Two bearing portions 2a are integrally provided on the back of the carriage 2, and the guide shaft 5 is inserted in these bearing portions 2a. Also, on the front face of the carriage 2, a guide rail sandwiching portion 2b and a carriage deformation preventing stopper 2c are integrally provided as two sandwiching portions. The guide rail sandwiching portion 2b and the carriage deformation preventing stopper 2c are each comprised of two members projectedly provided at an interval in a vertical direction with the plate-like guide rail 12 interposed therebetween. Thus, the carriage 2 is supported by the two bearing portions 3a, the guide rail sandwiching portion 2b and the carriage deformation preventing stopper 2c. Thereby, the distance between the nozzle portion of the recording head cartridge 1 mounted on the carriage 2 and the recording medium P (see FIG. 9) is kept constant.

The spacing between the two members constituting the carriage deformation preventing stopper 2c is greater than the spacing between the two members constituting the guide rail sandwiching portion 2b, and the carriage 2 is supported substantially at three points except the carriage deformation preventing stopper 2c. This is because if the sliding load of the carriage 2 is considered, to support the carriage 2 in parallelism to the base 14 during recording, it will suffice to support it simply at three points which are not arranged on one and the same straight line. However, when the recording head cartridge 1 is mounted or dismounted with respect to the carriage 2, there is the possibility of the carriage 2 being unnecessarily displaced or deformed by a load applied to the guide rail sandwiching portion 2b and the bearing portions 2a to thereby cause an inconvenience in operation. Accordingly, the carriage deformation preventing stopper 2c is provided to prevent the displacement or deformation of the carriage 2. Also, it is because when the recording head cartridge 1 is mounted or dismounted with respect to the carriage 2, a force is applied to the head guide 22 side that the carriage deformation preventing stopper 2c is provided on the head guide 22 side shown in FIG. 3.

The flexible cable 3 connected to the control base plate (not shown) is drawn around a predetermined route and is fixed by a cable keeper 21 so that a cable terminal portion 3a provided at the tip end portion thereof may be positioned inside the right side wall of the carriage 2 shown in FIG. 3. The head terminal portion of the recording head cartridge 1 bears against the cable terminal portion 3a when the recording head cartridge 1 is mounted on the carriage 2, whereby the electrical connection thereof with the recording head cartridge 1 is made.

Also, two head positioning projections 2d and 2e are integrally provided on that surface of the carriage 2 on which the cable terminal portion 3a is positioned. Of these two head positioning projections 2d and 2e, one head positioning projection 2d is of a square shape having its tip end pointed and is provided more inwardly than the cable terminal portion 3a, and the other head positioning projection 2e is of a cylindrical shape having its tip end made into a cone and is provided on this side with respect to the cable terminal portion 3a.

In a state in which the recording head cartridge 1 has been mounted on the carriage 2, one head positioning projection 2d is engaged with the head positioning cut-away of the recording head cartridge 1 which will be described later and the other head positioning projection 2e is engaged with the head positioning aperture of the recording head cartridge 1 which will be described later, whereby the accurate positioning of the recording head cartridge 1 relative to the carriage 2 is done. Further, a contact spring 23 is provided at a region opposed to the cable terminal portion 3a, and a head guide 22 formed of resin is secured to the tip end thereof. That is, the head guide 22 is resiliently supported on the carriage 2. The head guide 22 is engaged with the head pressing portion of the recording head cartridge 1 which will be described later in the state in which the recording head cartridge 1 has been mounted on the carriage 2, and the recording head cartridge 1 is biased toward the cable terminal portion 3a by the spring force of the contact spring 23. Also, the carriage 2 is of such a shape that it escapes a white reference shutter lever 72 and therefore, does not interfere with the white reference shutter lever 72 even when the carriage 2 has come to the left end shown in FIG. 1.

The image scanner unit will now be described with reference to FIGS. 11A to 11E. FIGS. 11A to 11E show the constructions of the image scanner unit mounted in the ink jet recording apparatus of the present embodiment, FIG. 11A being a perspective view thereof, FIG. 11B being a top plan view thereof, FIG. 11C being a side view in which a scanner terminal portion can be seen, FIG. 11D being a side view in which a scanner projected portion can be seen, and FIG. 11E being a bottom plan view thereof.

Referring to FIGS. 11A and 11B, the image scanner unit 70 is provided with a scanner mounting-dismounting operation portion 70a so that like the recording head cartridge 1, the user can put his fingers thereon so as to easily remove it. A scanner terminal portion 70b shown in FIG. 11C is electrically connected to the aforedescribed cable terminal portion 3a and is for transmitting read image data to the control base plate (not shown). An LED window 70c shown in FIG. 11E is a window through which light from an LED contained in the interior is transmitted, and the light from the LED is applied to a surface on which an image to be read is recorded to thereby obtain light necessary to detect the image by a reading sensor. A light condensing window 70d is a window for directing the reflected light from the image to the reading sensor. A scanner projected portion 70e plays the role of bringing down the white reference shutter lever 72 when the image scanner unit 70 is mounted on the carriage 2 and is scanned to the left end shown in FIG. 9.

Here, the dimension indicated by X in FIG. 5 is shorter by about 8 mm than the dimension indicated by Y in FIG. 11E. That is, in FIG. 5, there is no portion corresponding to the scanner projected portion 70e and therefore, in a state in which the recording head cartridge 1 has been mounted on the carriage 2, even if the image scanner unit is scanned to the left end shown in FIG. 9, it will never happen that the white reference shutter lever 72 is brought down. That is, in the state in which the recording head cartridge 1 has been mounted, it never happens that the reference surface of the white reference 71 faces upwardly.

Figure 12:
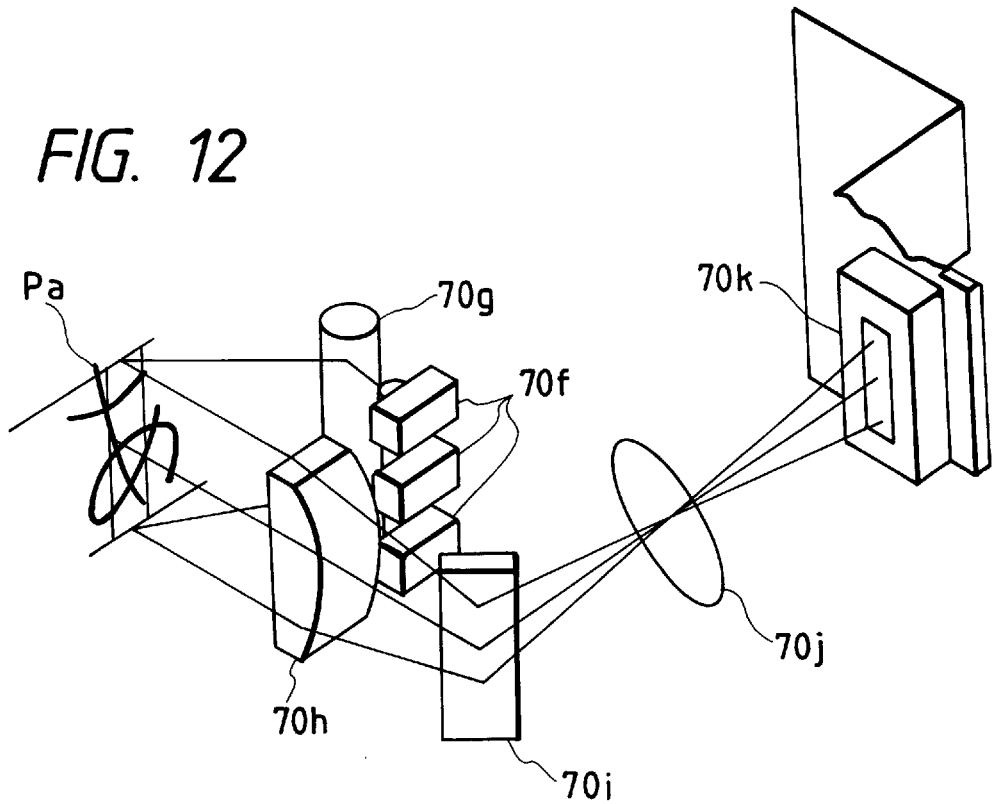
FIG. 12 is a construction view showing the optical system of the image scanner unit shown in FIGS. 11A to 11E.

The internal construction of the image scanner unit 70 will now be described with reference to FIG. 12. FIG. 12 is a construction view showing the optical system of the image scanner unit shown in FIGS. 11A to 11E.

In FIG. 12, light emitted from an LED 70f is condensed by a condensing lens 70g and is applied to a reading position for an image Pa recorded on the recording medium P. Reflected light reflected from the image Pa by the light from the LED 70f is imaged on a reading sensor 70k by imaging lenses 70h, 70j and a mirror 70i. On the reading sensor 70k, a binary image corresponding to the formed image is formed and is transmitted as image data to the control base plate (not shown) through the flexible cable 3. This reading sensor 70k comprises 128 sensor elements arranged on a straight line at a pitch of 360 dpi.

Figure 13A:
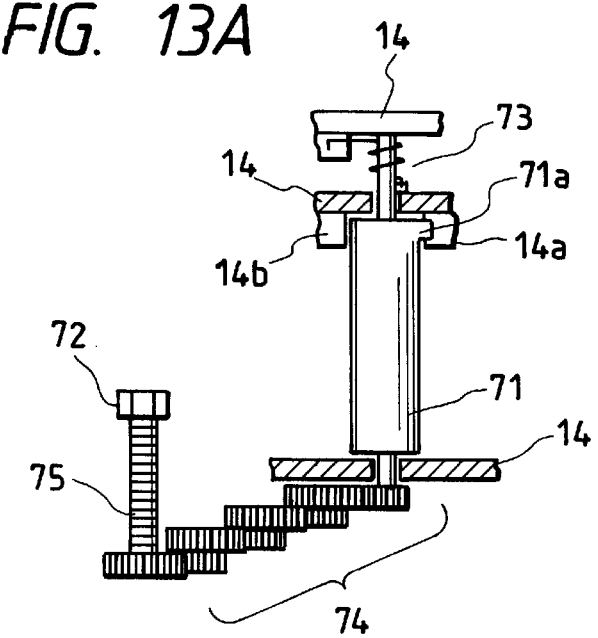
FIGS. 13A and 13B show the operating mechanism for a white reference shown in FIG. 9, FIG. 13A being an opened-up view thereof as it is seen from the upper surface thereof, and FIG. 13B being an opened-up view thereof as it is seen from a side thereof.
Figure 13B:
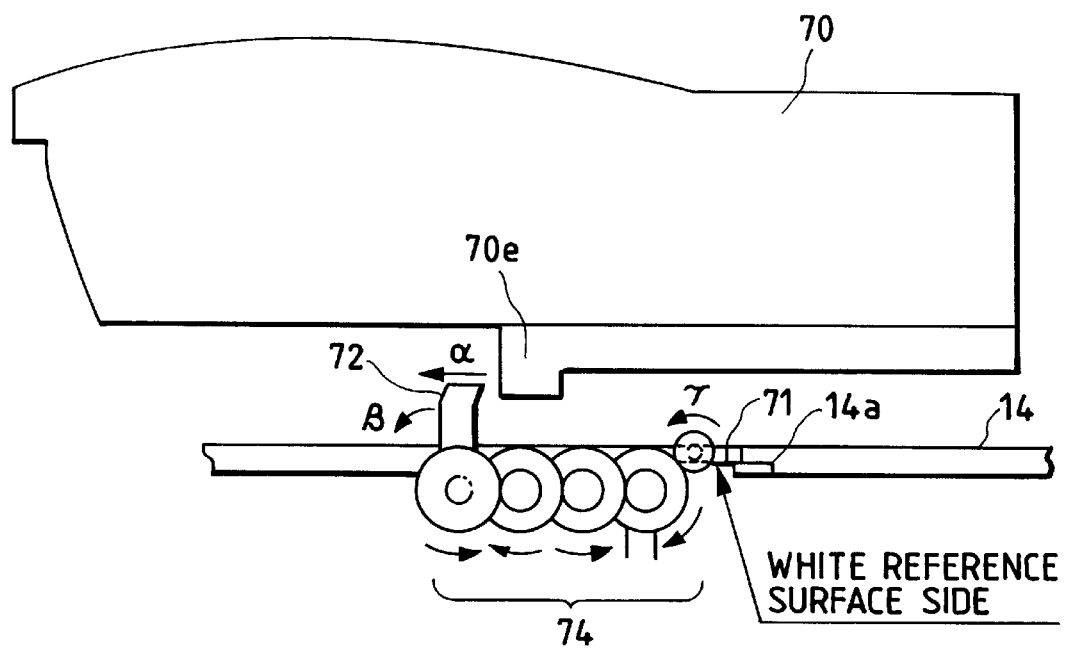

A shutter mechanism for the white reference will now be described with reference to FIGS. 13A and 13B. FIGS. 13A and 13B show an operating mechanism for the white reference shown in FIG. 9, FIG. 13A being an opened-up view thereof as it is seen from the upper surface thereof, and FIG. 13B is an opened-up view thereof as it is seen from a side thereof.

Referring to FIGS. 13A and 13B, rotary shafts are formed on the opposite ends of the white reference 71 and are rotatably supported on the base 14. The white reference 71 is designed such that when no force is applied to the white reference shutter lever 72, a projected portion 71a is biased by a spring 73 in a direction to collide against a base restraining portion 14a as shown in FIG. 13A so that the reference surface for calibration may not face downwardly and be stained. Also, when the image scanner unit 70 is mounted on the carriage 2 and the carriage 2 is scanned to the left end shown in FIG. 9, the scanner projected portion 70e is moved in the direction of arrow α as shown in FIG. 13B and the white reference shutter lever 72 is brought down in the direction of arrow β. When the white reference shutter lever 72 is brought down, the rotational motion thereof is transmitted to a reduction gear train 74 through an elastic shaft member 75 made of an elastic material, whereby the white reference 71 is rotated in the direction of arrow γ through the reduction gear train 74. As a result, the white reference is rotated until the projected portion 71a thereof collides against the base restraining portion 14b, and is stopped with the reference surface thereof for calibration turned upwardly. Even if the scanner projected portion 70e advances too much in the direction of arrow α, this is absorbed by the elastic shaft member 75 so that the white reference may not be rotated too much.

Figure 14:
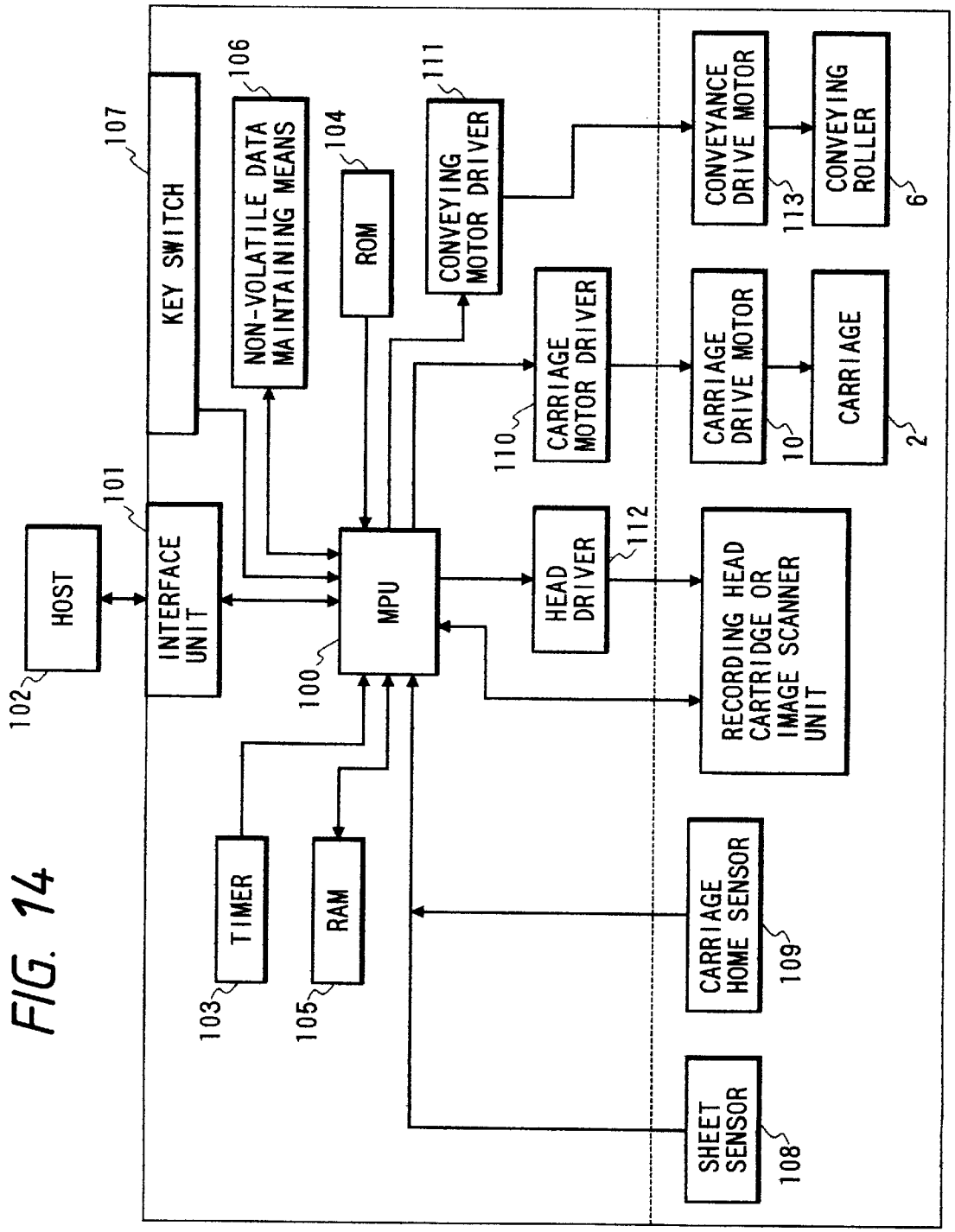
FIG. 14 is a block diagram showing the construction of the control system of an ink jet recording apparatus capable of carrying an image scanner thereon.

FIG. 14 is a block diagram showing the construction of the control system of an ink jet recording apparatus capable of carrying thereon the image scanner of each embodiment of the present invention. MPU 100 is a central information processing element which effects the control of the entire apparatus. An interface unit 101 effects the control of communications with the MPU 100 and a host 102, and the transmission and reception of information such as a recording command and image scan command from the host 102 or image data from the MPU 100 are effected through the interface unit 101. A timer 103 is used by the MPU 100 to effect the custody of time such as a preliminary discharge interval necessary in the control of the ink jet recording apparatus. ROM 104 stores therein control programs for the ink jet recording apparatus and the image scanner, and the MPU 100 carries out processing in accordance with these control programs. RAM 105 temporarily stores therein the recording data to the recording medium P and the read image data. Non-volatile data maintaining means 106 is a memory element of which the memory content can be rewritten and is preserved still after a power source is dropped. Data stored in the non-volatile data maintaining means 106 are the amount of discharged ink, the preliminary amount of discharge and the amount of suction for image recording executed in the past, and on the basis of such information, the MPU 100 calculates the amount of ink remaining in the ink tank 30 and the life of a waste ink containing portion. A key switch 107 is an input portion for setting the starting command and mode of the recovery operation of the nozzle portion 50.

Also, the MPU 100 confirms signals from a sheet sensor 108 for detecting the presence or absence of the recording medium P when the recording medium P is conveyed and a carriage home sensor 109 for detecting whether the carriage 2 is in a standby position wherein the recovery operation or the like of the nozzle portion 50 is performed, and outputs driving commands to a carriage motor driver 110 and a conveying motor driver 111. A carriage drive motor 10 and a conveyance drive motor 113 are driven by the carriage motor driver 110 and the conveying motor driver 111, respectively, to thereby cause the recording head cartridge 1 or the image scanner unit 70 mounted on the carriage 2 to scan and also rotate the conveying roller 6 and convey the recording medium P. Also, the MPU 100 outputs to a head driver 112 a recording signal which is an electrical signal for ink discharge, and the head driver 112 in turn applies a voltage to the electro-thermal conversion members 50e in the recording head cartridge 1 to thereby discharge the ink. Further, the MPU 100 receives a signal for discriminating between the recording head cartridge 1 and the image scanner unit 70, and changes over the control programs in conformity with their respective operations.

On the aforementioned control base plate, not shown, there are carried the MPU 200, the interface unit 101, the timer 103, the ROM 104, the RAM 105, the non-volatile data maintaining means 106, the key switch 107, the carriage motor driver 110, the conveying motor driver 111 and the head driver 112.

As described above, when the calibration of the image scanner unit 70 is not carried out, the reference surface of the white reference 71 is isolated from the space in which recording is effected by the recording head cartridge 1 and therefore, the reference surface of the white reference 71 is not stained and any inconvenience during calibration does not occur and cleaning becomes unnecessary. Consequently, there can be provided an ink jet recording apparatus capable of carrying an image scanner thereon which entirely eliminates the necessity of the user being conscious of the presence of the white reference.

While the present embodiment has been described with respect to a case where the image scanner unit 70 and the recording head cartridge 1 are of the interchangeable type, the gist of the present invention is not restricted thereto, but the image scanner unit 70 may always be fixed to the carriage 2.

Also, while the present embodiment has been described with the mechanism whereby the white reference 71 is rotated about a shaft and the reference surface for calibration is hidden and appears taken as an example, the gist of the present invention is not restricted thereto, but use may be made of a construction in which for example, the reference surface of the white reference 71 is always supported for sliding toward the image scanner unit 70, a window for the white reference 71 is prepared and the white reference 71 is slidden, whereby it is made opposed to the image scanner unit 70. Further, use may be made of a construction in which the white reference 71 is always fixed in a posture turned toward the image scanner unit 70 side and a shutter for covering it during non-use is provided and is opened during calibration. Also, the mechanism of the shutter may be of the slide type, the rotation type or the like.

Also, while the present embodiment has been described with the case where the reference surface of the white reference 71 is hidden or opposed to the image scanner unit 70 by the scanning of the carriage 2 taken as an example, the gist of the present invention is not restricted thereto, but for example, the white reference 71 may be operated by an actuator such as a motor or a solenoid, or may be operated by other drive source such as the conveying motor for the recording medium P.

Also, while the present embodiment has been described with the case of the serial type in which the image scanner unit 70 and the recording head cartridge 1 are carried on the carriage 2 which is scanned in a direction orthogonal to the conveyance direction of the recording medium P taken as an example, the gist of the present invention is not restricted thereto, but for example, the image scanner unit 70 may be of the line type having a length equal to the width of the recording medium P and the recording head cartridge 1 may likewise be of the full multi type.

Also, while the image scanner unit 70 has been described with the case of monochrome taken as an example, the gist of the present invention is not restricted thereto, but the image scanner unit may be a color image scanner unit.

Further, while description has been made with it taken as an example that the reference surface of the white reference 71 is opposed to the image scanner unit 70 only when the image scanner unit 70 is on the carriage 2 and is moved to the white reference 71 side, the gist of the present invention is not restricted thereto, but if necessary, as previously described, a driving actuator for the white reference 71 may be independently provided, whereby the white reference may continue to be opposed to the image scanner unit 70 until a series of calibration procedures are terminated or as long as the mounting of the image scanner unit 70 is elastically recognized.

The present embodiment, which is constructed as described above, achieves the following effect.

Provision is made of the isolating means for isolating the reference surface of the white reference from the space in which recording is effected by the recording head in the apparatus when the calibration of the image scanner unit is not carried out, whereby the reference surface of the white reference is not stained and any inconvenience during calibration does not occur and cleaning becomes unnecessary. Accordingly, there can be provided an ink jet recording apparatus capable of carrying an image scanner thereon which entirely eliminates the necessity of the user being conscious of the presence of the white reference.

[Third Embodiment]

Figure 15:
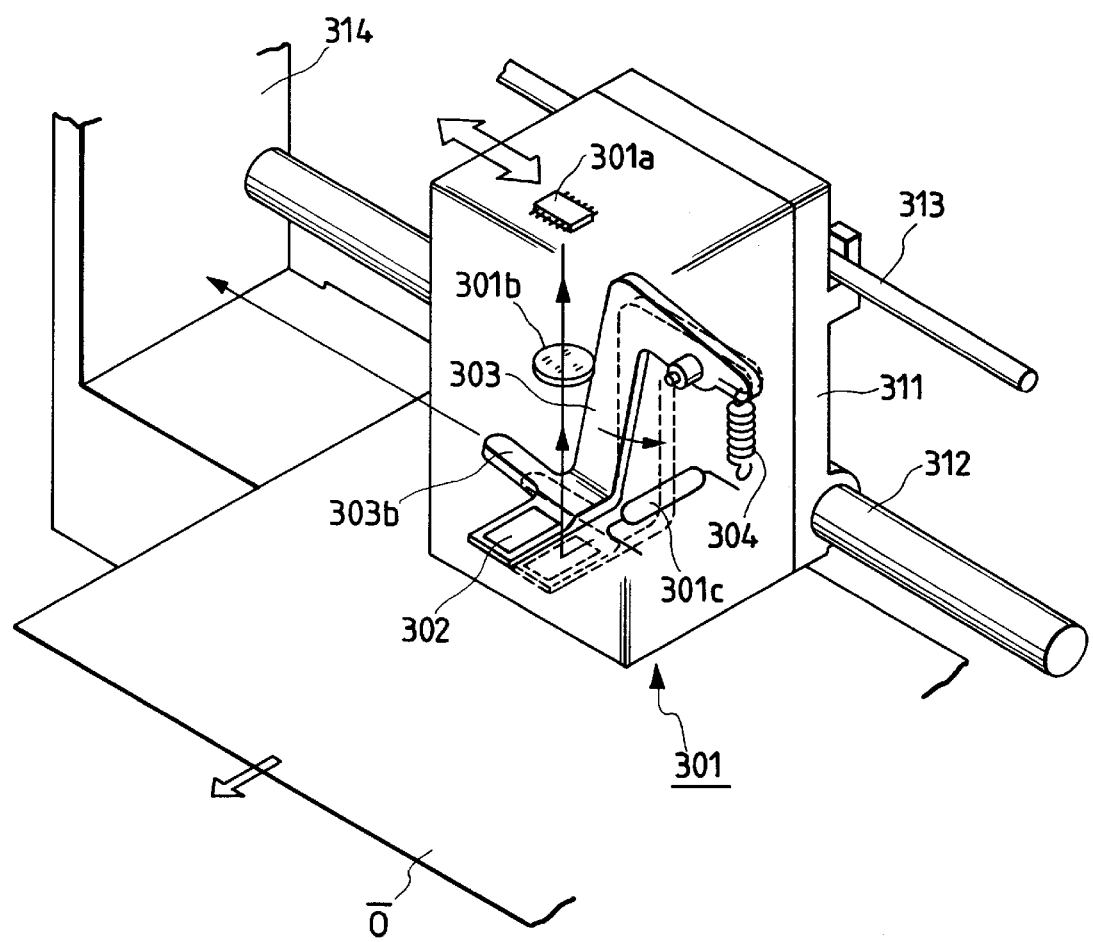
FIG. 15 is a schematic perspective view showing a reading unit which is a characteristic portion of an ink jet recording apparatus according to a third embodiment of the present invention.
Figure 16:
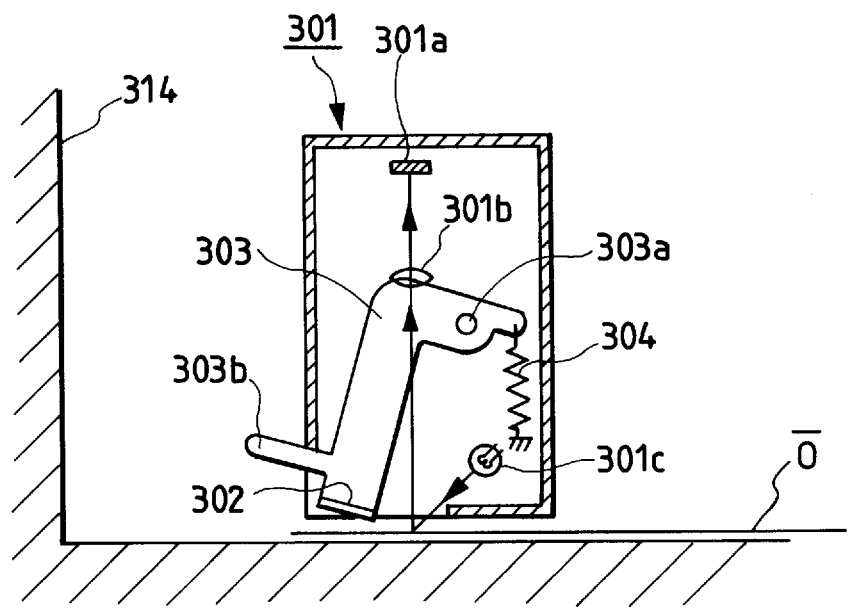
FIG. 16 is a vertical cross-sectional view of the reading unit shown in FIG. 15 when in an original reading state as it is seen from its front.
Figure 17:
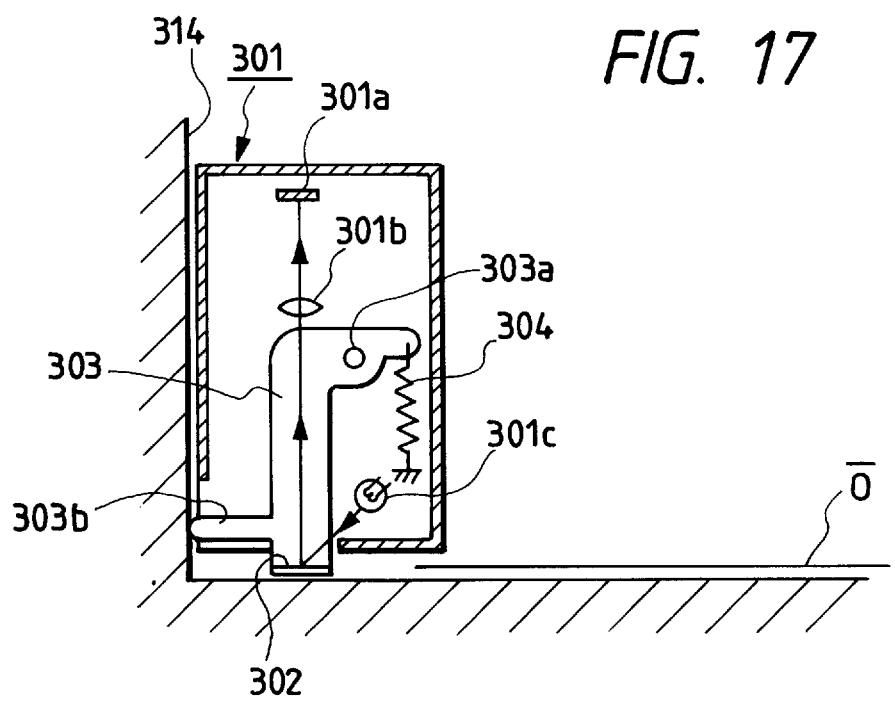
FIG. 17 is a vertical cross-sectional view of the reading unit shown in FIG. 15 during white correction as it is seen from its front.

FIG. 15 is a schematic perspective view showing a reading unit which is a characteristic portion of an ink jet recording apparatus according to a third embodiment of the present invention, FIG. 16 is a vertical cross-sectional view of the reading unit shown in FIG. 15 when in an original reading state as it is seen from its front, and FIG. 17 is a vertical cross-sectional view of the reading unit shown in FIG. 15 during white correction as it is seen from its front.

Referring to FIG. 15, a reading unit 301 in the present embodiment is carried on a carrier 311 interchangeably with a recording head unit (not shown). The carrier 311 is supported by carrier guides 312 and 313 for sliding movement in the lengthwise direction thereof. The opposite end portions of the carrier guides 312 and 313 are fixed to side wall portions 314. Also, in the lower portion of the reading unit 301, an original O may be conveyed in a direction orthogonal to the direction of movement of the reading unit.

Such a reading unit 301, as shown in FIGS. 15 and 16, has hollow structure in which there are contained a sensor 301a, a main lens 301b, a lamp 301c, etc. The reading unit 301 opens at its lower portion, and through this opening portion, the light of the lamp 301c is applied to the original O in the lower portion of the unit, and the light reflected from this original is made to enter the sensor 301a through the main lens 301b.

A lever 303 rotatably supported by a fulcrum 303a is provided in the reading unit 301 a tension spring 304 is secured to one end portion of the lever 303 and raises the other end portion of the lever positioned on the reading optical path from the surface of the original to the sensor 301a about the fulcrum 303a. At this time, an operating portion 303b formed near the other end portion of the lever 303 is adapted to protrude from an opening in a side wall of the reading unit 301.

Also, a white reference which is reference correction means 302 for effecting the correction of brightness is attached to the other end portion of the lever 303.

This lever 303 is of such a shape that usually one end portion to the other end portion thereof does not hamper the reading optical path from the lamp to the original and from the original to the sensor 301a.

When as shown in FIG. 17, the reading unit 301 is moved to a side wall portion 314, the operating portion 303b strikes against the side wall portion 314 and the lever 303 is pivotally moved about the fulcrum 303a, and the reference correction means 302 on the other end portion thereof forms the same plane as the surface of the original irradiated by the lamp 301*c*. Accordingly, the light from the lamp 301*c* is reflected by the white reference which is the reference correction means 302 and enters the sensor 301*a*, whereby white correction is effected.

Figure 18:
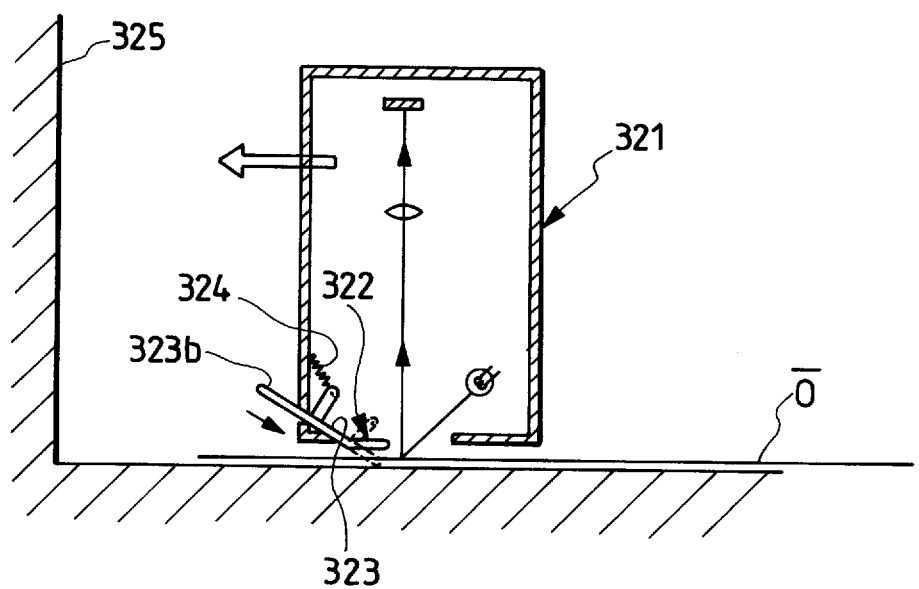
FIG. 18 is a vertical cross-sectional view for illustrating the construction of a reading unit which is a characteristic portion of another form of the reading unit of FIG. 15.

FIG. 18 is a vertical cross-sectional view for illustrating the construction of a reading unit which is a characteristic portion of another form of the third embodiment.

The reading unit 321 shown in FIG. 18 is of such structure that a lever 323 having attached thereto a white reference which is reference correction means 322 slides, and when the reading unit 321 approaches a side wall portion 325, an operating portion 323*b* strikes against it and the lever 323 slides obliquely downwardly and the reference correction means 322 is disposed at the position of the surface of the original. Also, when the reading unit 321 is spaced apart from the side wall portion 325, the reference correction means 322 is adapted to be retracted from the position of the surface of the signal by a spring 324.

While the above-described ink jet recording apparatus is of such structure that the operating portion 303*b*, 323*b* of the lever 303, 323 is protruded from a side of the reading unit 301, 321 and with the movement of the reading unit 301, 321, the operating portion 303*b*, 323*b* is caused to strike against the side wall portion 314, 325, whereby the reference correction means 302, 322 is moved and disposed on the reading optical path, the correction by such reference correction means need not always be effected at the movement end of the reading unit 301, but may be effected in the course of the movement of the reading unit with the operating portion protruded from the rear of the reading unit.

The present embodiment, which is constructed as described above, achieves the following effects.

(1) Since the reference correction means such as the white reference is disposed in the reading unit, it never happens that the ink is discharged by mistake to the reference correction means by the recording head unit during recording, and reference correction is done regularly.

(2) As in item (1) above, there is no fear that the reference correction means is contaminated by the scatter of the ink and the adherence of mist-like ink during recording.

(3) Since the reference correction means is not on the apparatus body side, it is unnecessary to mount it in the recording apparatus by the adjustment during the manufacture of the reading unit, and the adjustment of reference correction can be accomplished singly in the reading unit by a jig or the like.

(4) There is no positional regulation when the reference correction means is disposed on the apparatus body side.

What is claimed is:

1. A recording apparatus having a carriage for selectively and exchangeably mounting a reading unit for reading an original and a recording head for recording on a recording medium, said apparatus comprising:

a white flat plate removably provided at a position opposed to said reading unit along an area where said carriage moves.

2. A recording apparatus according to claim 1, wherein said flat plate serves also as a white reference setting member in a reading operation.

3. A recording apparatus according to claim 1, wherein said recording head is an ink jet recording head for discharging ink from an ink discharge port.

4. A recording apparatus according to claim 1, wherein said recording head is an ink jet recording head for discharging ink from an ink discharge port by heat energy applied by an electro-thermal conversion member.

5. A reading unit for use in a recording apparatus in which a recording head unit for effecting recording on a recording medium and said reading unit for reading the image of an original are selectively interchangeable relative to a reciprocally movable carrier, including:

original image reading means constituting a predetermined reading optical path entering and reflected by the surface of said original to read the image of said original; and a movable member having reference correction means for reading moved to a position on said reading optical path corresponding to the surface of said original when said carrier is in a predetermined position.

6. A reading unit according to claim 5, wherein said movable member is a lever having a portion thereof protruded outside said reading unit.

7. A reading unit according to claim 5, wherein said reference correction means comprises a white reference or a pattern mark.

8. A reading unit according to claim 5, wherein said recording head is an ink jet recording head for discharging ink from an ink discharge port.

9. A reading unit according to claim 5, wherein said recording head is an ink jet recording head for discharging ink from an ink discharge port by heat energy applied by an electro-thermal conversion member.

10. A recording apparatus having mounting means operable to selectively mount a recording head for discharging ink to record an image and an image scanner unit for reading an image recorded on a recording medium and a white reference provided opposed to said mounting means and having a reference surface to calibrate said image scanner unit, said apparatus comprising:

separating means for separating the reference surface of said white reference from a space where said recording head records in said apparatus when said image scanner unit is not calibrated.

11. A recording apparatus according to claim 10, wherein when said image scanner unit alone is mounted on said mounting means, said separating means causes the reference surface of said white reference to be opposed to said image scanner unit.

12. A recording apparatus according to claim 10, wherein said mounting means is provided with scanning means for causing said mounting means to scan in a direction orthogonal to a conveyance direction of the recording medium, and when said mounting means is caused to scan to a position opposed to said white reference, said separating means causes the reference surface of said white reference to be opposed to said image scanner unit.

13. A recording apparatus according to claim 10, wherein said recording head is an ink jet recording head for discharging ink from an ink discharge port.

14. A recording apparatus according to claim 10, wherein said recording head is an ink jet recording head for discharging ink from an ink discharge port by heat energy applied by an electro-thermal conversion member.

15. A recording apparatus having a carriage for selectively and exchangeably mounting a reading unit for reading an original and a recording head for recording on a recording medium, said apparatus comprising:

means for supplying a reference white light to said reading unit, said supplying means being removably provided at a position opposed to said reading unit along an area where said carriage moves.

16. A recording apparatus according to claim 15, wherein said recording head is an ink jet recording head for discharging ink from an ink discharge port.

17. A recording apparatus according to claim 15, wherein said recording head is an ink jet recording head for discharging ink from an ink discharge port by heat energy applied by an electro-thermal conversion member.

18. A recording apparatus having mounting means for selectively and exchangeably mounting a reading unit for reading an original and a recording head for recording on a recording medium, said apparatus comprising:

means for supplying a reference white light to said reading unit, said supplying means being removably provided at a position opposed to said reading unit along an area where said mounting means shifts.

19. A recording apparatus according to claim 18, wherein said recording head is an ink jet recording head for discharging ink from an ink discharge port.

20. A recording apparatus according to claim 18, wherein said recording head is an ink jet recording head for discharging ink from an ink discharge port by heat energy applied by an electro-thermal conversion member.

21. A recording apparatus having mounting means operable to selectively mount a recording head for discharging ink to record an image and an image scanner unit for reading an image recorded on a recording medium and means for supplying a reference white light to said reading unit, said supplying means being opposed to said mounting means to calibrate said image scanner unit, said apparatus comprising:

separating means for separating said supplying means from a space where said recording head records in said apparatus when said image scanner unit is not calibrated.

22. A recording apparatus according to claim 21, wherein said recording head is an ink jet recording head for discharging ink from an ink discharge port.

23. A recording apparatus according to claim 21, wherein said recording head is an ink jet recording head for discharging ink from an ink discharge port by heat energy applied by an electro-thermal conversion member.

* * * * *

UNITED STATES PATENT AND TRADEMARK OFFICE
CERTIFICATE OF CORRECTION

PATENT NO. : 5,880,852

DATED : March 9, 1999

INVENTOR(S) : SHINYA ASANO, ET AL.

It is certified that error appears in the above-identified patent and that said Letters Patent is hereby corrected as shown below:

COLUMN 5

Line 8, "path" should read --paths--.

COLUMN 11

Line 33, "slidden," should read --slided,--.

COLUMN 12

Line 48, "a" should read --and a--.

Signed and Sealed this

Thirtieth Day of November, 1999

Q. TODD DICKINSON

Attest:

Attesting Officer

Acting Commissioner of Patents and Trademarks